3,094,521
ALKANOYLTHIO AND PYRAZOLO ANDROSTANE DERIVATIVES
Arthur A. Patchett, Metuchen, Glen E. Arth, Cranford, and Frances G. Hoffman, Newark, N.J., assignors to Merck & Co., Inc., Rahway, N.J., a corporation of New Jersey
No Drawing. Filed July 25, 1961, Ser. No. 126,508
13 Claims. (Cl. 260—239.5)

This invention is concerned generally with novel steroids and processes of preparing the same. More particularly, it relates to novel compounds having the following structure:

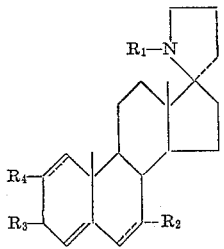

in which $R_1$ may be hydrogen or alkanoyl of less than nine carbons, $R_2$ may be hydrogen or lower alkanoylthio, $R_3$ may be β-hydroxyl, keto, or together with $R_4$ a pyrazolo ring, $R_4$ is hydrogen or together with $R_3$ a pyrazolo ring, at least one of $R_2$ and $R_4$ being other than hydrogen and the dotted lines in the 1, 2 and 6, 7 positions shows that these bonds may be single or double bonds, only one of them being a double bond at any one time.

The above-described compounds, as well as the 7α-alkanoylthio and pyrazolo derivatives and the $\Delta^{1,4}$- and $\Delta^{4,6}$-analogues thereof possess useful therapeutic properties as aldosterone inhibitors. These novel steroids block the salt-retaining effects of aldosterone and other salt-retaining steroids so as to be useful in the treatment of diseases such as congestive heart failure, nephrosis and cirrhosis of the kidney in which aldosterone secretion is increased.

In preparing our novel chemical compounds, the starting material utilized is 3β-acetoxy-5-androstene-17-one-oxime. (See Flow Sheet A.) The preparation of the 3β-acetoxy-5-androstene-17-one-oxime, also known as dehydroisoandrosterone acetate oxime, is described in an article by E. B. Hershberg in J. Org. Chem., 13, 542 (1948). This compound is first brominated to give the 3β-acetoxy-17α-bromo-17β-nitro-5-androstene - 3 - acetate, for example, by treating sequentially with N-bromosuccinimide in aqueous dioxane, and then with concentrated nitric acid. The bromine is then removed from the 3β-acetoxy-17α-bromo-17β-nitro-5-androstene compound to give 3β-acetoxy-17β-nitro-5-androstene. This can be accomplished by refluxing with sodium borohydride in aqueous tetrahydrofuran solution.

The 3β-acetoxy-17β-nitro-5-androstene is converted into 3β-hydroxy-17β-nitro-5-androstene, for example, by refluxing with an aqueous methanolic solution of an alkali metal bicarbonate and then treating with hydroxylamine hydrochloride. The 3β-hydroxy-17β-nitro-5-androstene is oxidized to 17β-nitro-4-androstene-3-one, for example, by using aluminum isopropoxide and cyclohexanone (or acetone) in a hydrocarbon solvent such as toluene.

The 3β-acetoxy-17β-nitro-5-androstene is converted to 3-(3'-oxo-17'β-amino - 4' - androstene-17'α-yl)-propionic acid lactam by the following series of reactions (see Flow Sheet B):

The 3β-acetoxy-17β-nitro-5-androstene is reacted with methyl acrylate to give 3β-acetoxy-17α-[2'-methoxycarbonylethyl]-17β-nitro-5-androstene. Reduction of 3β-acetoxy - 17α - [2'-methoxycarbonylethyl]-17β-nitro-5-androstene with zinc dust in acid solution gives 3-(3'β-acetoxy-17'β-amino-5'-androstene-17'α-yl)-propionic acid lactam. The latter compound is converted into 3-(3'β-hydroxy-17'β-amino-5'-androstene-17'α-yl)-propionic acid lactam for example, by heating with an aqueous methanolic solution of alkali metal bicarbonate. The 3-(3'β-hydroxy-17'β-amino - 5' - androstene-17'α-yl)-propionic acid lactam is oxidized to 3-(3'-oxo-17'β-amino-4'-androstene-17'α-yl)-propionic acid lactam, for example, by using aluminum isopropoxide and cyclohexanone (or acetone) in a hydrocarbon solvent such as toluene.

The 3-(3'β-hydroxy-17'β-amino - 5' - androstene - 17'α-yl)-propionic acid lactam is converted to 3-(3'-hydroxy-17'β-methylamino-5'-androstene-17'α-yl)-propionic acid lactam by reaction first with dihydropyran in the presence of an acidic catalyst to form 3-(3'β-hydroxy-17'β-amino-5'-androstene-17'α-yl)-propionic acid lactam 3β-tetrahydropyranyl ether, and then methylating the latter compound, for example, using methyl iodide and sodium hydride followed by acid treatment to give 3-(3'β-hydroxy - 17'β - methylamino - 5' - androstene - 17'α - yl)-propionic acid lactam. The 3-(3'β-hydroxy-17'β-methylamino-5'-androstene-17'α-yl)-propionic acid lactam is then oxidized to 3-(3'-oxo-17'β-methylamino-4'-androstene-17'α-yl)-propionic acid lactam. The oxidation may be brought about by using aluminum isopropoxide and cyclohexanone (or acetone) in a hydrocarbon solvent such as toluene.

The 3-(3'β-hydroxy-17'β-amino-5'-androstene-17'α-yl)-propionic acid lactam is converted into 3-oxo-4-androstene-17-spiro-2'-(1'-2')β-pyrrolidene (see Flow Sheet C) by first reducing 3-(3'β-hydroxy-17'β-amino-5'-androstene-17'α-yl)-propionic acid lactam with lithium aluminum hydride in a solvent such as dioxane to give 3β-hydroxy-5-androstene-17-spiro-2'-(1' - 2')β - pyrrolidene and then oxidizing 3β-hydroxy-5-androstene-17-spiro-2'-(1'-2')β-pyrrolidene to 3-oxo-4-androstene-17-spiro-2'-(1'-2')β-pyrrolidene, for example, by using aluminum isopropoxide and cyclohexanone (or acetone) in a hydrocarbon solvent such as toluene.

The 3β-hydroxy-5-androstene-17-spiro - 2' - (1' - 2')β-pyrrolidene is converted into 3β-acyloxy-5-androstene-17-spiro-2'-(1'-2')β-1'-acylpyrrolidene by treating with an acylating agent, e.g. a lower hydrocarbon carboxylic acid acylating agent such as benzoic anhydride or tertiary butyl acetyl chloride; a lower alkanoic anhydride or lower alkanoyl halide such as acetic anhydride, propionic anhydride or acetyl chloride; or a polybasic anhydride such as β,β-dimethylglutaric anhydride, succinic anhydride and the like, in the presence of an organic base such as pyridine.

The 3β-acyloxy-5-androstene-17-spiro-2'-(1'-2')β - 1'-acylpyrrolidene is refluxed with an aqueous methanolic solution of alkali metal bicarbonate to give 3β-hydroxy-5-androstene-17-spiro-2'-(1'-2')β-1'-acylpyrrolidene. The latter compound is then oxidized to 3-oxo-4-androstene-17-spiro-2'-(1'-2')β-1'-acylpyrrolidene, for example, using aluminum isopropoxide and cyclohexanone (or acetone) in a hydrocarbon solvent such as toluene.

The 3-(3'-oxo-17'β-amino-4'-androstene-17'α-yl)-propionic acid lactam, 3-(3'-oxo-17'β-methylamino-4'-androstene-17'α-yl)-propionic acid lactam and 3-oxo-4-androstene-17-spiro-2'-(1'-2')β-1'-acetylpyrrolidene are converted into the corresponding $\Delta^{1,2}$-analogues on treatment with selenium dioxide under the conditions described in Example 12. (See Flow Sheet C.)

The 3-(3'-oxo-17'β-amino-4'-androstene-17'α-yl)-propionic acid lactam, 3-(3'-oxo-17'β-methylamino-4'-androstene-17'α-yl)-propionic acid lactam and 3-oxo-4-androstene-17-spiro-2'-(1'-2')β - 1' - acylpyrrolidene are converted into the corresponding 3-(7'α-alkanoyl-3'-oxo-17'β-amino-4'-androstene-17'α-yl)-propionic acid lactam, 3-(7'α-alkanoylthio-3'-oxo-17'β-methylamino - 4' - androstene-17'α-yl)-propionic acid lactam and 7α-alkanoylthio-3 - oxo - 4 - androstene - 17 - spiro - 2' - (1' - 2')β - 1'-acylpyrrolidene by dehydrogenation with chloranil to form the Δ⁴,⁶-analogue, and then reacting the latter compound with a thioalkanoic acid. Among the radicals comprehended by the expression alkanoyl are formyl, acetyl, propionyl, butyryl, valeryl, hexanoyl, heptanoyl, octanoyl and branched-chain isomers thereof, said alkanoyl radicals being the acyl radicals of alkanoic acids containing fewer than nine carbon atoms.

The addition of thioalkanoic acids to the 6,7-double bond of the intermediates employed in the practice of this invention proceeds under steric influences such that of the stereoisomers formed, one is obtained in predominant amount, which, in each case, has been characterized herein as possessing the α-configuration of the 7-acylthio-group. However, the designated configuration of the 7-acylthio group is based upon data presently appearing in the chemical literature, and is therefore not to be interpreted except in relation to the state of the art presently known to organic chemists. It will be apparent that no part of the specification will be materially defective if it should later be established that the configuration is the opposite of that deducible from data presently available to workers in the field.

The 3-(3'-oxo-17'β-amino-4'-androstene-17'α-yl)-propionic acid lactam, 3-(3'-oxo-17'β-methylamino-4'-androstene-17'α-yl)-propionic acid lactam and 3-oxo-4-androstene - 17 - spiro - 2' - (1' - 2')β - 1' - acylpyrrolidene are converted into the corresponding 3-([3',2'-c]pyrazolo-17'β-amino-4'-androstene-17'α-yl)-propionic acid lactam, 3 - ([3',2' - c]pyrazolo - 17'β - methylamino - 4' - androstene-17'α-yl)-propionic acid lactam, and [3,2-c]pyrazolo - 4 - androstene - 17 - spiro - 2' - (1' - 2')β - 1' - acrylpyrrolidene by first reacting with an alkyl formate and sodium hydride in an inert atmosphere to form the corresponding 2-hydroxymethylene-derivative, and then reacting the latter compound with hydrazine or a monosubstituted hydrazine to form the corresponding pyrazolo compound which is exemplified in Flow Sheet C as compound 3-([3',2'-c]pyrazolo-17'β-methylamino-4'-androstene-17'α-yl)-propionic acid lactam. The structure of the pyrazolo-compound designated in the flow sheet is based upon an interpretation of data according to the state of the art presently known to organic chemists. However, it is to be understood that no part of the specification will be materially defective if it should later be established that the correct structure of any of these compounds with respect to the position of the double bonds and the R'' substituent in the pyrazole ring is isomeric to the structure shown, and in particular if the following structure exists:

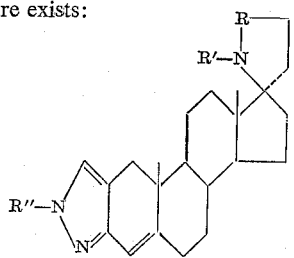

wherein R stands for

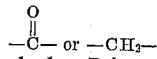

R' is hydrogen or alkyl when R is

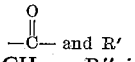

and R' is acyl when R is —CH₂—, R'' is hydrogen, alkyl, cycloalkyl, aryl or aralkyl.

To form the pyrazolo compound the 2-hydroxymethylene-steroid is dissolved in a solvent such as absolute ethanol, and heated with hydrazine or an alkyl, cycloalkyl, aralkyl, or aryl substituted hydrazine in an inert atmosphere. A hydrazine salt may be used in the presence of a buffering agent such as sodium acetate. Among the substituted hydrazines which may be used for reaction with the above-described 2-hydroxymethylene-steroid compounds in the process of our invention are: alkylhydrazines, such as butylhydrazines, β-hydroxyethylhydrazine and cyclohexylhydrazine; arylhydrazines such as phenylhydrazine, o-, m-, and p-halophenylhydrazines, o-, m-, and p-tolylhydrazines, o-, m-, and p-alkoxyphenylhydrazines, o-, m-, and p-nitrophenylhydrazine, 1-hydrazinonaphthalene, 2 - hydrazinopyridine, 3 - hydrazinopyridine, 4-hydrazinopyridine, 4-hydrazinopyridine oxide, and 2-hydrazinopyrimidine; and aralkylhydrazines, such as benzylhydrazine and phenylethylenehydrazine.

*Flow Sheet A*

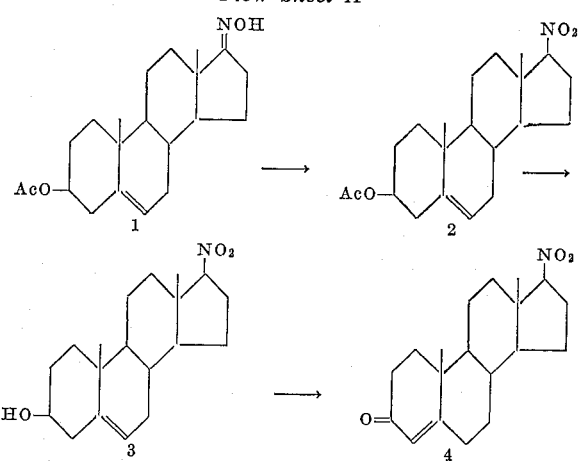

*Flow Sheet B*

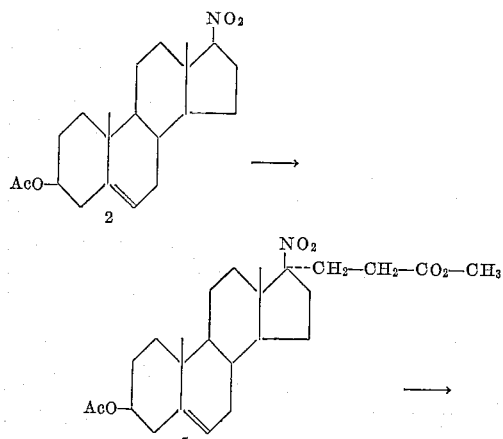

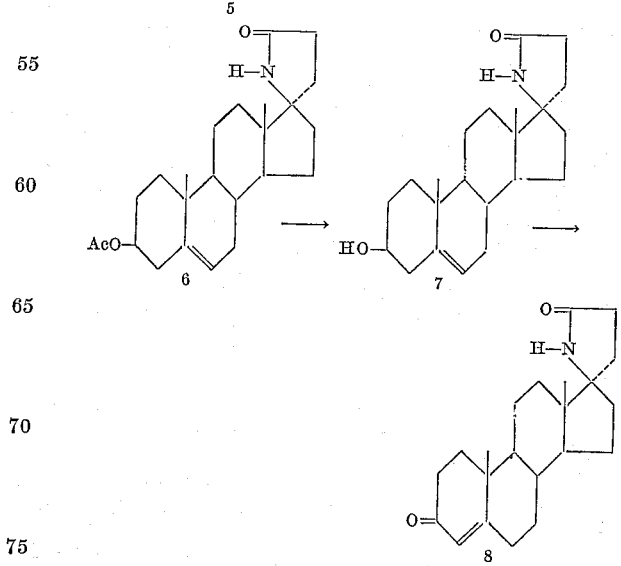

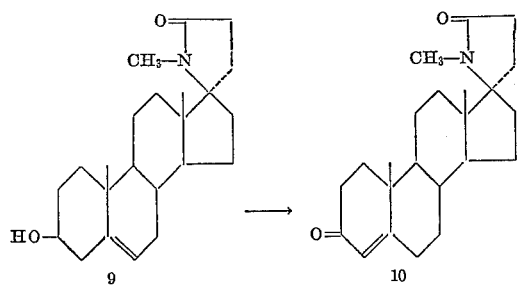
wherein R stands for
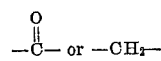
R' is hydrogen or alkyl when R is
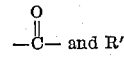
is acyl when R is —CH₂—, R" is hydrogen, alkyl, cycloalkyl, aryl or aralkyl.
*Flow Sheet C*
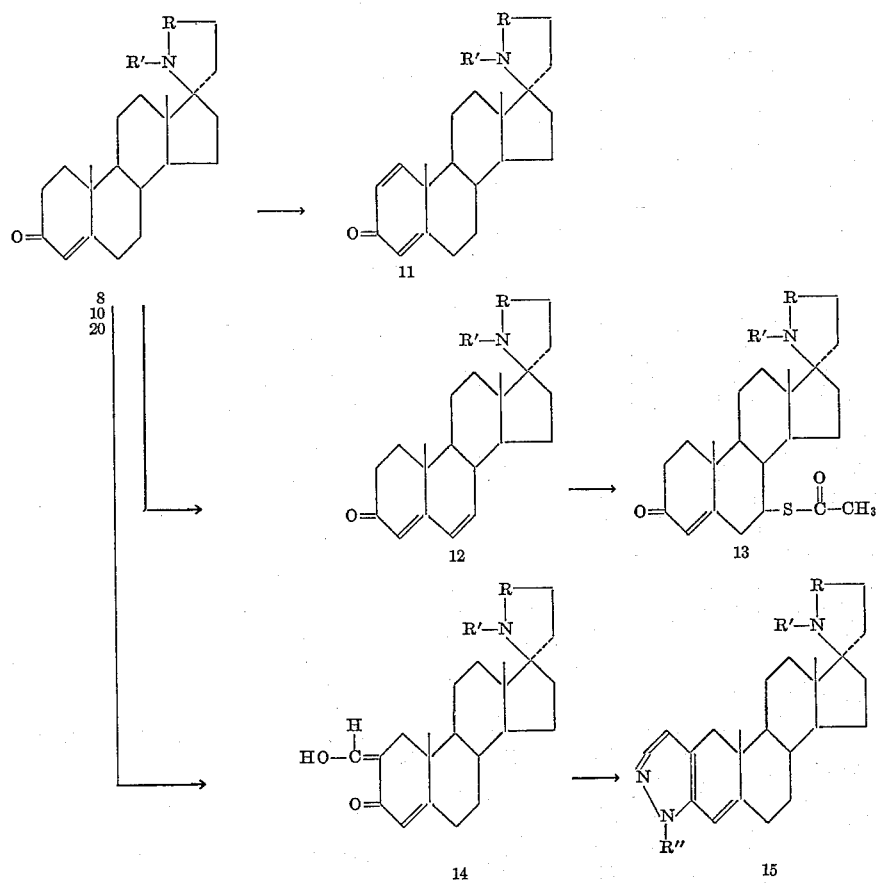
*Flow Sheet D*
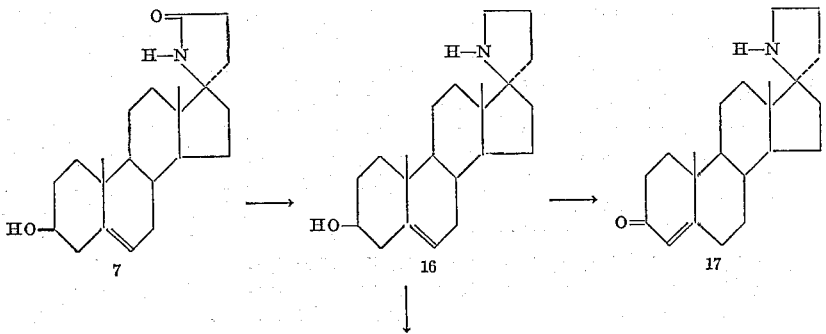

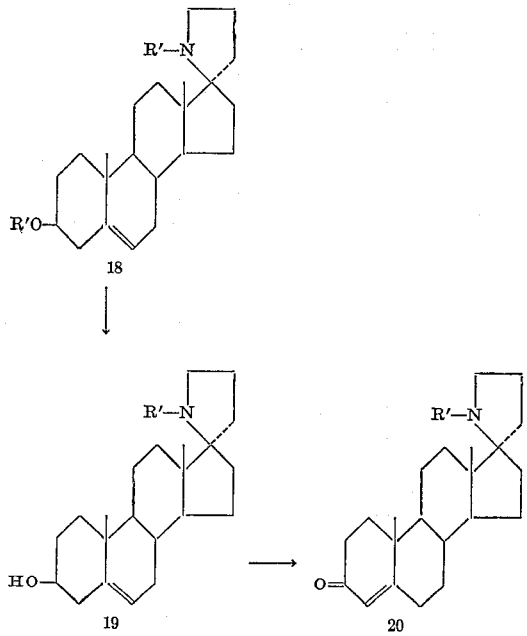

wherein R' is acyl.

The following examples illustrate methods of carrying out the present invention but it is to be understood that these examples are given for purposes of illustration and not of limitation.

EXAMPLE 1

A slurry of 16.35 g. of N-bromosuccinimide in 45 ml. water and 60 ml. dioxane is stirred vigorous in 500 ml. 3-necked flask. To it is added simultaneously at a rapid drop-wise rate a slurry of 7.59 g. of sodium bicarbonate in 45 ml. of water and 10.41 g. of 3β-acetoxy-5-androstene-17-one oxime in 90 cc. of dioxane. The resultant bluish-green reaction mixture is stirred an additional fifteen minutes at room temperature. Water is then added and the bromo-nitroso intermediate is extracted into petroleum ether. The washed and dried solvent is removed on the rotator at room temperature to give 10.95 g. of product.

Five grams of this crude bromo-nitroso intermediate is dissolved in 200 ml. of petroleum ether. To the vigorously stirred solution there is added slowly 40 ml. of concentrated nitric acid. Stirring is continued at room temperature for fifteen minutes and then water and ethyl acetate are added. The solvent is washed with water and dilute sodium bicarbonate and then dried and removed in vacuo to give 4.3 g. of crude 17α-bromo-3β-hydroxy-17β-nitro-5-androstene-3-acetate.

Removal of the bromine from this latter compound is accomplished by refluxing it in 100 ml. of tetrahydrofuran and 10 ml. of water with 2.0 g. of sodium borohydride. After an hour the mixture is cooled and 5.0 g. of hydroxylamine hydrochloride in 100 ml. of water is added. The steroid is extracted into ethyl acetate. The solvent is removed and the residue is reacetylated by heating it fifteen minutes on the steam bath with 15 ml. of acetic anhydride and 15 ml. of pyridine. The crude 3β-acetoxy-17β-nitro-5-androstene weighs 4.07 g. Several recrystallizations from ethanol affords a pure sample, M.P. 208–212° C., $[\alpha]_D$—29.7° C.

EXAMPLE 2

A solution of 1.5 g. of 3β-acetoxy-17β-nitro-5-androstene in 120 ml. of methanol and 12 ml. of water are refluxed for three hours with 3 g. of potassium bicarbonate. Most of the methanol is removed in vacuo, aqueous hydroxylamine hydrochloride is added and the product is extracted into ethyl acetate. Removal of the dried solvent leaves 3β-hydroxy-17β-nitro-5-androstene of sufficient purity for the next step.

About 15 ml. of toluene is distilled from a solution of 1 g. of 3β-hydroxy-17β-nitro-5-androstene in 16 ml. of cyclohexanone and 150 ml. of toluene. Then 5 ml. is added of a 20% solution of aluminum isopropoxide in toluene and the mixture is refluxed for one and one-half hours in an apparatus protected from atmospheric moisture with an anhydrous calcium sulfate tube. Some water is added and the organic layer is decanted off, filtered and concentrated in vacuo. Chromatography on neutral alumina affords 300 mg. of product from the ether and ether-chloroform (9:1) fractions. Recrystallization from methanol-ether gives analytically pure 17β-nitro-4-androstene-3-one of M.P. 152–5° C., U.V. $\lambda_{max}$ 240 mμ, E% 448 and $[\alpha]_D$.

EXAMPLE 3

A partial suspension is prepared of 20 g. of 3β-acetoxy-17β-nitro-5-androstene in 150 cc. of t-butanol and 75 cc. of methyl acrylate. Thirty cc. of methanolic tetramethylammonium hydroxide is added slowly with magnetic stirring whereupon all of the steriod goes into solution. After eighteen hours at room temperature, the reaction mixture is poured onto iced dilute HCl. It is then extracted with ethyl acetate. Removal of the washed and dried solvent, finally at high vacuum, leaves a semicrystalline residue. Crystallization from ether and petroleum ether affords 12.86 g. of 3β-acetoxy-17α-[2'-methoxycarbonylethyl]-17β-nitro-5-androstene. The analytical sample from the same solvent has a M.P. of 133–4° C., $[\alpha]_D$—57° C. (dioxane).

EXAMPLE 4

Two grams of 3β-acetoxy-17α[2'-methoxycarbonylethyl]-17β-nitro-5-androstene are dissolved in 150 ml. of glacial acetic acid and heated under reflux with stirring with 2 g. of zinc dust for seventy-two hours. An additional 1 g. of zinc dust is added at each twenty-four hour interval of heating. The reaction mixture is then filtered, washed with warm glacial acetic acid and concentrated to dryness in vacuo. The residue is extracted with ethyl acetate and water, and the solvent is dried and evaporated to yield 1.9 g. of crude 3-(3'β-acetoxy-17'β-amino-5'-androstene-17'α-yl)-propionic acid lactam. Recrystallization from acetone-ether gives 1.6 g. of product, M.P. 300–305° C.; infrared absorption occurs at 3.16, 5.78, 5.85 and 8.1μ.

EXAMPLE 5

1.6 grams of 3-(3'β-acetoxy-17'β-amino-5'-androstene-17'α-yl)-propionic acid lactam is refluxed for two hours with 3 g. of potassium bicarbonate in 300 ml. of methanol and 30 ml. of water. Most of the solvent is then removed in vacuo, water is added and the crystalline product is filtered off. The yield is 1.2 g. of 3-(3'β-hydroxy-17'β-amino-5'-androstene-17'α-yl)-propionic acid lactam, M.P. 285–295° C. (from methylene chloride-methanol) and infrared absorption at 2.95, 3.10 and 5.86μ.

A solution of 500 mg. of 3-(3'β-hydroxy-17'β-amino-5'-androstene-17'α-yl)-propionic acid lactam in 8 ml. of cyclohexanone and 75 ml. of toluene is dried by distilling off 10 ml. Then 2.5 ml. of a 20% aluminum isopropoxide solution in toluene is added. After refluxing for a five-hour period, a small amount of water is added to the cooled solution and the toluene is filtered off and taken to dryness. Most of the excess cyclohexanone is removed at the oil pump at 100° C. The desired 3-(3'-oxo-17'β-amino-4'-androstene-17'α-yl)-propionic acid lactam, is eluted from silica gel with chloroform-acetone 1:1. The crude yield is 250 mg. which is recrystallized from methylene chloride/ether to give a product M.P. 270–275° C., infrared absorption at 2.9, 3.1, 5.9, 6.0 and 6.2μ and U.V. $\lambda_{max}$ 240, E% 448.

EXAMPLE 6

Five-hundred mg. of 3-(3'β-hydroxy-17'β-amino-5'-androstene-17'α-yl)-propionic acid lactam is reacted at room temperature for eighteen hours with 50 ml. of dry dihydropyran and 150 mg. of p-toluenesulfonyl chloride. This mixture is then diluted with 5% sodium bicarbonate solution and 300 mg. of a crystalline precipitate of the 3-(3'β-hydroxy-17'β-amino-5'-androstene-17'αyl)-propionic acid lactam 3'β-tetrahydropyranyl ether is collected.

A solution is prepared of 250 mg. of this tetrahydropyranyl ether in 8 ml. of dimethylformamide and 16 ml. of benzene. Eight ml. of benzene is distilled off to insure dryness. After the addition of 80 mg. of sodium hydride, a yellow anion developed. Two ml. of methyl iodide is added and the mixture is stirred overnight under nitrogen and then refluxed for one hour. The mixture is diluted with benzene, washed with water, dried and evaporated to yield 192 mg. of crude 3-(3'β-hydroxy-17'β - methylamino - 5' - androstene - 17'α - yl) - propionic acid lactam 3'β-tetrahydropyranyl ether.

The reversal of the ether at C–3' is accomplished by adding the steroid to a mixture of 20 mg. of p-toluene sulfonic acid in 10 ml. of ethanol. After eighteen hours at room temperature, some of the ethanol is removed on the rotator, water is added and the product is extracted into ethyl acetate. The solvent is washed with dilute sodium bicarbonate, dried and evaporated. Recrystallization of the residue from methylene chloride-ether yields 140 mg. of 3-(3'β-hydroxy-17'β-methylamino-5'-androstene-17'α-yl)propionic acid lactam, M.P. 255–260° C.

EXAMPLE 7

About 10 ml. of solvent is distilled from a solution of 500 mg. of 3-(3'β-hydroxy-17'β-methylamino-5'-androstene-17'α-yl)-propionic acid lactam in 8 ml. of cyclohexanone and 75 ml. of toluene. Then 2.5 ml. of a 20% solution of aluminum isopropoxide in toluene is added and the mixture is refluxed for three hours. A small amount of water is added to the cooled solution which is filtered and evaporated to dryness. Elution from neutral alumina with ether and ether-chloroform (1:1) affords 311 mg. of 3-(3'-oxo-17'β-methyl-amino-4'-androstene17'α-yl)-propionic acid lactam. It is recrystallized from methylene chloride-ether to give a product with infrared absorption at 5.95, 6.0 and 6.2μ and U.V. $\lambda_{max}$ 240, E% 448.

EXAMPLE 8

One gram of 3 - (3'β - hydroxy - 17'β -amino - 5'-androstene-17'α-yl)-propionic acid lactam is refluxed with 3 g. of lithium aluminum hydride in 400 ml. of purified dioxane for ninety hours. Ether and saturated aqueous sodium potassium tartrate are added carefully to the cooled solution. This mixture is filtered through Supercel (an infusorial earth) and then concentrated in vacuo to remove most of the dioxane. Dilute sodium hydroxide is added and the desired amine is brought into ethyl acetate with several extractions. Removal of the washed and dried solvent leaves 820 mg. of 3β-hydroxy-5-androstene-17-spiro-2'-(1'-2')β-pyrrolidene which is recrystallized from methanol-ethyl acetate to M.P. 194–5° C., infrared absorption at 3.18μ.

EXAMPLE 9

A solution of 500 mg. of 3β-hydroxy-5-androstene-17-spiro-2'-(1'-2')β-pyrrolidene in 8 ml. of cyclohexanone and 75 ml. of toluene is dried by distilling off 10 ml. Then 2.5 ml. of a 20% aluminum isopropoxide solution in toluene is added. After refluxing for 5 hours, a small amount of water is added to the cooled solution and the toluene is filtered off and taken to dryness. Most of the excess cyclohexanone is removed at the oil pump at 100° C. The residue is eluted from silica gel with chloroform-acetone (1:1) to give 310 mg. of 3-oxo-4-androstene-17-spiro-2'-(1'-2')β-pyrrolidene from 500 mg. of alcohol. A hydrochloride is prepared by dissolving the free base in a small amount of methanol to which a 20–40 fold quantity of ether is added. After centrifuging off impurities, HCl gas is added to precipitate the salt. This salt is recrystallized several times from methanol-methyl ethyl ketone to give a product with melting point greater than 350° C., infrared absorption at 3.69, 3.81, 4.05, 5.98, 6.21 and 6.30μ and U.V. $\lambda_{max}$ 239.5, E% 446.

EXAMPLE 10

The diacetylation of 250 mg. of 3β-hydroxy-5-androstene-17-spiro-2'-(1'-2')-β-pyrrolidene is accomplished with 2.5 ml. of acetic anhydride and 2.5 ml. of pyridine. This mixture is heated on the steam bath under nitrogen for one and one-half hours. It is then taken to dryness on the rotating evaporator and the residue is crystallized from methylene chloride-ether. The analytical sample of 3β-acetoxy-5-androstene-17-spiro-2'-(1'-2')β-1'-acetylpyrrolidene has a M.P. 208.5–210° C. and infrared absorption at 5.78 and 6.10μ.

EXAMPLE 11

A solution of 298 mg. of 3β-acetoxy-5-androstene-17-spiro-2'-(1'-2')β-1'-acetylpyrrolidene in 35 ml. of methanol, 3.5 ml. of water and 600 mg. of potassium bicarbonate is refluxed for three hours. Most of the methanol is removed in vacuo, water is added and essentially pure 3β-hydroxy-5-androstene - 17 - spiro-2'-(1'-2')β-1'-acetylpyrrolidene is recovered by ethyl acetate extraction. The product weighs about 200 mg. and has infrared absorption at 2.91μ and 6.14μ.

This material is azeotropically dried in a solution of 16 ml. of toluene, 8 ml. of dioxane, 8 ml. of benzene and 3.2 ml. of cyclohexanone. After most of the benzene has been distilled off, 1 ml. of a 20% aluminum isopropoxide solution in toluene is added. Reflux is maintained for three hours and then a small amount of water is added to the cooled solution. Filtration and removal of solvent under vacuum affords a crystalline residue of 3-oxo-4-androstene - 17 - spiro-2'-(1'-2')β-1'-acetylpyrrolidene. An analytical sample is prepared from ethyl acetate, M.P. 223.5–225.5° C., [α]$_D$=+23° C. infrared absorption at 6.00, 6.11 and 6.20μ and U.V. $\lambda_{max}$ 240, E% 419.

EXAMPLE 12

To 100 mg. of 3-(3'-oxo-17'β-amino-4'-androstene-

17'α-yl)-propionic acid lactam in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The mixture is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 3-(3'-oxo-17'β-amino-1',4'-androstadiene-17'α-yl)-propionic acid lactam.

In accordance with the above procedure, but starting with the 3-(3'-oxo-17'β-methylamino-4'-androstene-17'α-yl)-propionic acid lactam or the 3-oxo-4-androstene-17-spiro-2'-(1'-2')-β-1'-acetylpyrrolidene in place of the 3-(3'-oxo-17'β-amino-4'-androstene-17'α-yl)-propionic acid lactam, there is obtained the corresponding 3-(3'-oxo-17'β-methylamino-1',4'-androstadiene-17'α-yl)-propionic acid lactam or 3-oxo-1,4-androstadiene-17-spiro-2'-(1'-2'-)β-1'-acetylpyrrolidene.

EXAMPLE 13

A solution of 200 mg. of 3-(3'-oxo-17'β-amino-4'-androstene-17'α-yl)-propionic acid lactam and 400 mg. of chloranil in 30 ml. of t-butanol are refluxed overnight. The mixture is then taken down to dryness in vacuo and chromatographed on silica gel. Elution with chloroform-acetone (1:1) affords 60 mg. of 3-(3'-oxo-17'β-amino-4', 6'-androstadiene-17'α-yl)-propionic acid lactam, M.P. 310–315° C. (from acetone), U.V. $\lambda_{max}$ 279, E% 650.

In accordance with the above procedure, but starting with the 3-(3'-oxo-17'β-methylamino-4'-androstene-17'α-yl)-propionic acid lactam or the 3-oxo-4-androstene-17-spiro-2'-(1'-2')β-1'-acetylpyrrolidene in place of the 3-(3'-oxo-17'β-amino-4'-androstene - 17'α - yl) - propionic acid lactam, there is obtained the corresponding 3-(3'-oxo-17'β-methylamino-4',6'-androstadiene-17'a-yl) - propionic acid lactam or 3-oxo-4,6-androstadiene-17-spiro-2'-(1'-2')β-1'-acetylpyrrolidene.

EXAMPLE 14

To 10 ml. of freshly distilled thioacetic acid there is added 150 mg. of 3-(3'-oxo-17'β-amino-4',6'-androstadiene-17'α-yl)-propionic acid lactam. This solution is heated on the steam bath under nitrogen for one-half hour and excess thioacetic acid is blown off with nitrogen. The residue is taken up in ethyl acetate and washed with sodium bicarbonate and water. Removal of the dried solvent and trituration with methanol gives 50 mg. of 3-(7'α - acetylthio - 3' - oxo-17'β-amino-4'-androstene-17'α-yl)-propionic acid lactam, M.P. 244–8° C., U.V. $\lambda_{max}$ 238, E %440.

In accordance with the above procedure, but starting with the 3-(3'-oxo-17'β-methylamino-4'-6'-androstadiene-17'α-yl)-propionic acid lactam or the 3-oxo-4,6-androstadiene-17-spiro-2'-(1'-2')-β-1'-acetylpyrrolidene in place of the 3-(3'-oxo-17'β-amino-4',6'-androstadiene-17'α-yl)-propionic acid lactam there is obtained the corresponding 3 - (7' - α - acetylthio-3'-oxo-17'β-methylamino-4'-androstene-17'α-yl)-propionic acid lactam or 7α-acetylthio-3-oxo - 4 - androstene - 17 - spiro - 2' - (1' - 2')β - 1' - acetylpyrrolidene.

EXAMPLE 15

A suspension of 610 mg. of 3-(3'-oxo-17'β-amino-4'-androstene-17'α-yl)-propionic acid lactam in 50 ml. of dry benzene is stirred in a nitrogen atmosphere with 1 ml. of ethyl formate and 450 mg. of a suspension of about 54% sodium hydride in mineral oil at room temperature for 19 hours. Stirring is continued for 2 more hours after the addition of 1 ml. of ethyl formate and 350 mg. of sodium hydride. The reaction mixture is chilled in an icebath and acidified with an excess of an aqueous solution of sodium dihydrogen phosphate. The layers are separated and the aqueous phase is extracted with ether, with ethyl acetate and with methylene chloride. The combined organic layers are extracted with sodium bicarbonate to remove impurities. The product is then extracted into a 2% aqueous solution of sodium hydroxide. Acidification of the alkaline extracts with dilute hydrochloric acid gives a product which is taken up in methylene chloride. The solution is filtered and evaporated to dryness, to give 3-(2'-hydroxymethylene-3'-oxo-17'β-amino-4'-androstene-17'α-yl) - propionic acid lactam.

In accordance with the above procedure, but starting with the 3-(3'-oxo-17'β-methylamino-4'-androstene-17'α-yl)-propionic acid lactam or the 3-oxo-4-androstene-17-spiro-2'-(1'-2')β-1'-acetylpyrrolidene in place of the 3-(3'-oxo-17'β-amino-4'-androstene - 17'α - yl) - propionic acid lactam, there is obtained the corresponding 3-(2'-hydroxymethylene-3'-oxo-17'β-methylamino - 4'-androstene-17'α-yl)-propionic acid lactam or 2-hydroxymethylene-3-oxo - 4 - androstene-17-spiro-2'-(1'-2')-β-1'-acetylpyrrolidene.

EXAMPLE 16

A 25 mg. aliquot of 3-(2'-hydroxymethylene-3'-oxo-17'β-amino-4'-androstene-17'α-yl)propionic acid lactam is dissolved in 0.6 ml. of ethanol. An 0.032 ml. aliquot of a reagent, prepared by dissolving 0.48 ml. of hydrazine hydrate in 0.96 ml. of ethanol, is added and the mixture is refluxed under nitrogen for 45 minutes. The volatiles are removed in vacuo and the residue is extracted with hot methylene chloride. The methylene chloride solution is filtered to remove insolubles and taken to dryness. The residue is flushed two times with n-hexane and dried to give 3-([3',2'-c]pyrazolo-17'β-amino-4'-androstene-17'α-yl)-propionic acid lactam.

A mixture of 90 mg. of 3-(2'-hydroxymethylene-3'-oxo-17'β-amino-4'-androstene-17'α-yl)-propionic acid lactam and 0.028 ml. of phenylhydrazine are refluxed under nitrogen in 1.2 ml. of absolute ethanol for 50 minutes. The reaction mixture is taken to dryness. Water is added and the product is filtered to give an amorphous solid, which is washed successively with water, dilute acid, water, and petroleum ether. The product is crystallized from methanol to give 3-(1''-phenyl-[3'',2''-c]pyrazolo-17'β-amino-4'-androstene-17'α-yl)propionic acid lactam.

In accordance with the above procedure, but starting with the 3 - (2' - hydroxymethylene-3'-oxo-17'β-methyl-amino-4'-androstene-17'α-yl)-propionic acid lactam, 2-hydroxymethylene-3-oxo-4-androstene-17-spiro-2'-(1'-2')-β-1'-acetylpyrrolidene in place of the 3-(2'-hydroxymethylene-3'-oxo-17'β-amino-4'-androstene-17'a-yl)-propionic acid lactam there is obtained the corresponding 3-([3', 2'-c]pyrazolo-17'β-methylamino-4'-androstene-17'α - yl)-propionic acid lactam or [3'',2''-c]pyrazolo-4-androstene-17-spiro-2'-(1'-2')β-1'-acetylpyrrolidene, or the 1''-phenyl-derivatives thereof.

Various changes and modifications may be made in carrying out the present invention without departing from the spirit and scope thereof. Insofar as these changes and modifications are within the purview of the annexed claims, they are to be considered as part of our invention.

We claim:

1. A compound of the formula—

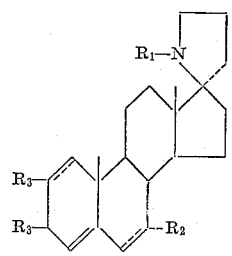

in which $R_1$ is selected from the group consisting of hydrogen and alkanoyl of less than nine carbons, $R_2$ is selected from the group consisting of hydrogen and lower alkanoylthio, $R_3$ is selected from the group consisting of $\beta$-hydroxyl, keto and, together with $R_4$, pyrazolo in which one of the nitrogen carries a substituent selected from the group consisting of hydrogen, alkyl, cyclohexyl, phenyl, halophenyl, tolyl, alkoxyphenyl, nitrophenyl, naphthyl, pyridyl, oxidopyridyl, pyrimidyl, benzyl and phenylethyl, $R_4$ is selected from the group consisting of hydrogen and, together with $R_3$, pyrazolo of the above description, and the dotted line between carbons 1 and 2 and 6 and 7 indicates that the bonds joining these carbons is selected from the group consisting of single and double bonds, only one of said bonds being a double bond, in which at least one of $R_2$ and $R_4$ is other than hydrogen.

2. 3 - oxo - 1,4-androstadiene-17-spiro-2'-(1'-2')$\beta$-1'-acetylpyrrolidine.

3. 3 - oxo - 4,6-androstadiene-17-spiro-2'-(1'-2')$\beta$-1'-acetylpyrrolidine.

4. 7$\alpha$ - alkanoylthio - 3-oxo-4-androstene-17-spiro-2'-(1'-2')$\beta$-1'-acylpyrrolidine.

5. 2 - hydroxymethylene - 3-oxo-4-androstene-17-spiro-2'-(1'-2')$\beta$-1'-acetylpyrrolidine.

6. [3,2 - c]pyrazolo-4-androstene-17-spiro-2'-(1'-2')$\beta$-1'-acetylpyrrolidine.

7. 3$\beta$ - hydroxy - 5 - androstene-17-spiro-2'-(1'-2')$\beta$-pyrrolidine.

8. 3-oxo-4-androstene-17-spiro-2'-(1'-2')$\beta$-pyrrolidine.

9. 3$\beta$ - acyloxy - 5-androstene-17-spiro-2'-(1'-2')$\beta$-1'-acylpyrrolidine.

10. 3$\beta$ - hydroxy-5-androstene-17-spiro-2'-(1'-2')$\beta$-1'-acylpyrrolidine.

11. 3 - oxo - 4-androstene-17-spiro-2'-(1'-2')$\beta$-1'-acylpyrrolidine.

12. The process for the preparation of 3$\beta$-hydroxy-5-androstene-17-spiro-2'-(1'-2')$\beta$-pyrrolidine which comprises reducing 3-(3'$\beta$-hydroxy-17'$\beta$-amino-5'-androstene-17'$\alpha$-yl-)-propionic acid lactam with lithium aluminum hydride.

13. The process for the preparation of 3$\beta$-hydroxy-5-androstene - 17-spiro-2'-(1'-2')$\beta$-1'-acylpyrrolidine which comprises heating an aqueous solution of 3$\beta$-acyloxy-5-androstene-17-spiro-2'-(1'-2')$\beta$-1'-acylpyrrolidine and an alkali metal bicarbonate.

References Cited in the file of this patent

UNITED STATES PATENTS 3,001,986   Burtner et al. _____ Sept. 26, 1961